Figure 1:
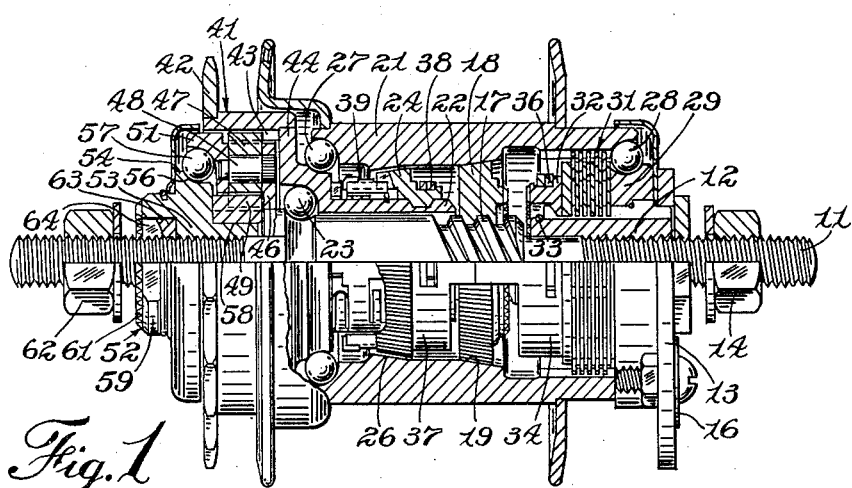

Dec. 25, 1962     E. E. HOOD     3,070,199

HUB AND COASTER BRAKE FOR VELOCIPEDES AND THE LIKE

Filed Aug. 24, 1960

WITNESS:

Esther M. Stockton

INVENTOR.
Edwin Elliott Hood
BY
ATTORNEY

United States Patent Office 3,070,199
Patented Dec. 25, 1962

3,070,199
HUB AND COASTER BRAKE FOR VELOCIPEDES AND THE LIKE
Edwin Elliott Hood, Elmira, N.Y., assignor to The Bendix Corporation, Elmira, N.Y., a corporation of Delaware
Filed Aug. 24, 1960, Ser. No. 51,624
6 Claims. (Cl. 192—6)

The present invention relates to a hub and coaster brake for velocipedes and the like and particularly relates to a cone adjustment member for maintaining proper bearing alignment therein.

It is an object of the present invention to provide a hub and coaster brake which is simple and durable in construction, reliable in operation and inexpensive to manufacture.

It is another object of the present invention to provide a cone adjustment means which can be locked to the axle to assure maintenance of proper bearing alignment during factory testing, shipping, and periods prior to assembly of the hub and brake in a velocipede frame, and to prevent misalignment caused by the reactive forces exerted by the operation of the brake and/or driving gears during those periods.

It is a further object of the invention to provide a cone adjustment locking means contained wholly within the cone.

It is still another object to provide a cone adjustment and locking means which when the hub and brake is assembled in the velocipede frame will allow dentil extremities on the cone to engage the frame in the normal manner thereby preventing indirect reactive forces of the brake and direct reactive forces of the driving gears from causing axial and radial misalignment of the bearings.

The foregoing and other objects and advantages of the invention will appear more fully from consideration of the detail description which follows in conjunction with the accompanying drawing wherein one embodiment of the invention is illustrated. It is to be expressly understood, however, that the drawing is for the purpose of illustration and description and is not to be construed as to defining the limits of the invention.

Figure 2:
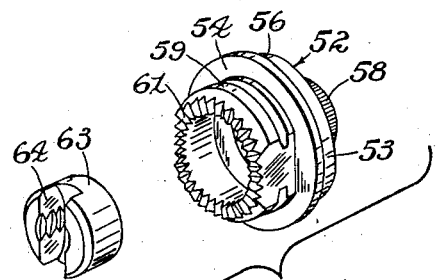

The following description is taken in connection and conjunction with the accompanying drawing, in which:

FIGURE 1 is a front elevation view, partly broken away and in section, of a preferred embodiment of the invention illustrating the cone adjustment member maintaining a two-speed hub and coaster brake mechanism and the bearings therefor in proper alignment; and FIGURE 2 is an exploded perspective detail view of the cone adjustment member and the locking means therefor.

In FIGURE 1 of the drawing there is illustrated a stationary axle 11 adapted to be mounted in the rear frame of a velocipede or the like. A brake anchor sleeve 12 is threaded on the axle and held from rotation by an arm 13 non-rotatably mounted and retained thereon by a clamping nut 14. The anchor arm is prevented from rotation by a clip 16 adapted to be attached to the frame of a velocipede in any convenient manner.

The low speed screw shaft 17 is rotatably mounted on the axle 11 and has a low speed clutch nut 18 threaded thereon adapted to be moved into and out of clutching engagement with a clutch surface 19 formed on the interior of the hub 21.

The high speed screw shaft 22 is rotatably mounted on the low speed screw shaft 17 by means of a bearing 23 and the high speed clutch nut 24 is threaded on the high speed screw shaft and adapted to be moved into and out of clutching engagement with a clutch surface 26 formed on the interior of the hub.

The hub is rotatably supported by means of bearings 27 and 28 journalled in races formed on the high speed screw shaft 22 and in a brake bearing cone 29 respectively. The brake bearing cone is fixedly mounted on or is an integral part of the brake anchor sleeve 12.

Brake discs, generally indicated at 31, are splined alternately to the hub 21 and to the brake anchor sleeve 12 and are so arranged that they can be pressed together against the brake bearing cone 29 by means of a brake pressure ring 32 loosely splined to the anchor sleeve. The brake pressure ring is retained on the anchor sleeve in any convenient manner such as by a lock ring 33.

Retarder means comprising a coupling member 34 journalled on the brake pressure ring 32 having a splined connection with the low speed clutch nut 18 and a wrapped-down coil spring frictional retarder 36 journalled on the brake pressure ring provide the necessary retardation of the clutch nuts causing them to be threaded upon their respective screw shafts; a second retarder means comprising a coupling member 37 journalled on the high speed clutch nut 24 having a splined connection with the low speed clutch nut 18 and a wrapped-down coil spring frictional retarder 58 provide retardation of the high speed clutch nut and any associated indexing and selector mechanisms.

The indexing and selector mechanisms, generally indicated at 39, are associated with the high speed clutch nut. The indexing and selector mechanisms enable the operator to alternatively allow or block the driving engagement of the high speed clutch nut with the hub. The mechanisms 39 do not constitute any part of this invention and consequently will not be further described. The mechanisms are more specifically described in the copending Hood-Gleasman application, Serial Number 46,231, filed July 29, 1960, now Patent 3,022,682.

The driving member, generally indicated at 41, provides the means for rotating the screw shafts at their various speeds or gear ratios. The driving member comprises a sprocket 42 and an orbit gear 43 which is secured by any convenient means to a driving ring member 44 which in turn is rigidly connected to an adjacent end of the high speed screw shaft. Rigidly secured on the adjacent end of the low speed screw shaft is a pinion carrier 46. A plurality of pinions 47 journalled on pintles 48 fixedly mounted in the pinion carrier mesh with the orbit gear 43 and a sun gear 49 hereinafter described. The forward extremity of the pintles 48 are carried in a ring support member 51.

A sprocket cone member 52 is threadedly received on the left hand extremity of the axle 11 in FIG. 1. The sprocket cone member comprises a body or support portion 53 which includes the threaded portion receiving the axle and carries an integral radial flange member 54. The extremity of the radial flange provides the inner race 56 for the bearing 57 which is rotatably supported between the radial flange 54 and the ring support member 51.

The sun gear 49 is fixedly secured as by brazing to an axially extending pilot portion 58 integral with the support portion 53 of the sprocket cone. If cost-wise expedient the sun gear 49 and the pilot portion 58 can be formed as an integral unit. For the purpose of this disclosure and solely for clarity they will be treated as separate entities.

Extending axially away from the support portion 53 is an integral annulus 59 providing a spatial separation between the internal surface of the annulus and the threaded extremity of the axle. The forward extremity of the annulus is provided with dentils 61 which upon assembly of the hub and brake into a velocipede frame are clamped to the frame by a jam nut 62 to assure the sprocket cone member 52 being non-rotatably secured to the axle against the reactive forces exerted by the braking member, or more particularly by the reactive forces exerted by the reduction gearing 43, 47 and 49.

The support body 53 of the cone sprocket 52 is engaged by a plug member 63 which is threadedly received on the axle within the spatial separation defined by the annulus. It is desirable that the plug member 63 have an axial dimension less than the axial dimension of the annulus 59 in order that, when assembled, the plug member 63 will be wholly within the spatial separation and have no parts projecting therefrom. The extremity of the plug member is provided with kerf means 64 to enable the plug to be readily assembled on the axle by means of a turning tool.

In operation the parts are assembled substantially as illustrated in FIG. 1. The sprocket cone member 52 is threaded upon the axle to a point where it exerts a direct thrust against the sprocket bearing 57 which in turn transfers the force axially throughout the hub and brake mechanism to the bearings 23, 27, 28, and 57. This axial thrust is of a predetermined value sufficient to cause the aforementioned bearings to be seated in their respective races and properly aligned to absorb any radial thrusts imposed upon them. For proper operation it is extremely important that the bearing alignment be initially properly determined and thereafter be maintained regardless of the treatment accorded the hub and brake assembly during testing, shipping, and prior to assembly into a velocipede frame. To accomplish and maintain this bearing setting or alignment the plug member 63 is threaded upon the axle into the spatial separation defined by the annulus 59 into engagement with the sprocket body 53, and thereby locks the sprocket cone member 52 in position.

Because the sprocket cone can be locked to the axle the brake and the hub assembly can be initially tested at the factory and the bearing alignment axial and radial thrust values definitely and properly determined by instruments not normally available outside of the factory. Thereafter, the hub and brake can be shipped and stored until such time as required for assembly into a completed velocipede or the like. If the brake or driving member are operated there is no danger of affecting the bearing alignment due to disturbing of the cone member 52 by reactive forces of the gears since the plug member 63 will definitely lock the sprocket cone in the desired position on the axle and thereafter maintain desired bearing alignment. When the hub and brake assembly is subsequently assembled in the rear frame of a velocipede or the like it is desirable that the dentils 61 be clamped by the jam nut 62 against one side of the frame member. This locking accomplished by the dentils will cause the sprocket member 52 and the frame to absorb the reactive forces exerted on the sprocket by the sun gear 49, and will further insure against rotational displacement of the sprocket. It will be apparent that in attaining the desired ends, that is having the dentils and the frame absorb the reactive forces, it is necessary for the plug member to be recessed within the annulus 59. The function served by the plug member will be somewhat different after the hub and brake assembly is assembled into the velocipede frame. When operation is in the driving direction the driving and braking mechanism tend to exert outwardly directed forces. These forces are effectively limited by the dentil-frame engagement and are supplemented by the plug member retaining forces. However, when the operation is in a braking direction even greater forces are exerted on the sprocket member by the driving gears and they are of such a nature or value as to tend towards threading the sprocket member 52 axially inward towards the driving and braking mechanisms. If the sprocket were allowed to be so threaded the axial and radial thrust forces on the bearing would be affected and malfunctioning of the mechanisms would soon occur. The plug member effectively assumes its mechanical obligations to permanently jam or lock the sprocket in its proper axial position relative to the aforementioned mechanisms. It can be appreciated that the effect on the sprocket member resulting from driving or braking operation and associated force factors would be just the opposite from that just described in the event the axle threading were changed to an opposite hand.

Although certain structures have been shown and described in detail, it will be understood that changes may be made in the design and arrangement of the parts without departing from the spirit of this invention. It will be apparent that while this disclosure has illustrated a semi-automatic two-speed hub and coaster brake it is not specifically limited thereto. Those skilled in the art can appreciate that the innovations herein disclosed and claimed can be utilized with the common single speed coaster brake and hub or with other forms of a multi-speed hub and coaster brake.

What is claimed is:

1. In a hub and coaster brake including driving gear means adapted for mounting in the frame of a velocipede and the like: a fixed axle; a hub mounted relative to the axle; brake means interengaging the axle and hub for braking hub rotation; means including a screw shaft journalled on an axle within the hub for driving the hub and actuating the brake means; a driving member including the gear means for rotating the screw shaft; bearing means rotatably supporting the hub and driving member relative to the axle; a sprocket cone member threadedly received on the axle for maintaining proper bearing alignment, said cone member including an annulus concentrically spaced about the axle having its free extremity dentiled and adapted to lockingly engage one side of said frame; locking means threadedly received on the axle wholly within the annulus for positioning and locking the cone member relative to the axle prior to mounting the hub and coaster brake in said frame; and means including a nut threadedly received on the axle mounted on the opposite side of said frame adapted to draw the frame into locking engagement with the annulus' dentiled extremity subsequent to positioning the hub and coaster brake in said frame for the locking of the cone member to the frame against the reactive forces of the brake means and the driving gear means.

2. In the device set forth in claim 1 the sprocket cone member including gearing anchor means cooperating with the driving member gearing means; said locking means comprising a threaded plug member having an axial dimension substantially less than the axial depth of the annulus, and kerf means in said plug member for threading the plug into the annulus.

3. A bearing adjustment device for an axle supported hub and brake assembly mountable in the frame of a velocipede or the like, comprising: a plurality of bearings rotatably supporting said assembly relative to the axle; a support member threadedly received on the axle; a radial flange on said support member; bearing support means on said flange adapted to provide a bearing inner race for supporting one of said bearings; an annulus on said support member extending axially away from said hub and brake assembly having its free extremity dentiled and adapted to lockingly engage one side portion of the frame, said annulus defining a spatial separation encompassing the axle; a lock nut threadedly received on the axle adapted to be positioned wholly within said spatial separation in abutting engagement with the support member for positioning and locking the support member relative to the axle to thereby properly axially position said bearings relative to said assembly and axle; and, means including a nut threadedly received on the axle mounted on the opposite side of said frame portion adapted to draw the frame into locking engagement with the annulus' dentiled extremity subsequent to the support member being lockingly positioned on the axle.

4. A device as set forth in claim 3 in which the lock nut includes means formed therein and contained within said annulus for rotating said nut within the annulus.

5. A device as set forth in claim 3 including further a driving member including reduction gearing for selectively driving the hub at one of two speeds and for operating the brake; and, anchor means formed on said support member to non-rotatably anchor a portion of said reduction gearing when the driving member is operated.

6. The device set forth in claim 3 including further a driving member including an orbit gear meshed with a plurality of planet pinions for driving the hub and operating the brake; and, sun gear means integrally formed on said support member operatively meshing with said planet pinions.

References Cited in the file of this patent
UNITED STATES PATENTS 2,910,157     Gleasman _____ Oct. 27, 1959

FOREIGN PATENTS 291,383     Germany _____ Apr. 15, 1916